(No Model.)
A. HYDE
TAIL STOCK FOR TURNING LATHES.
No. 258,582. Patented May 30, 1882.
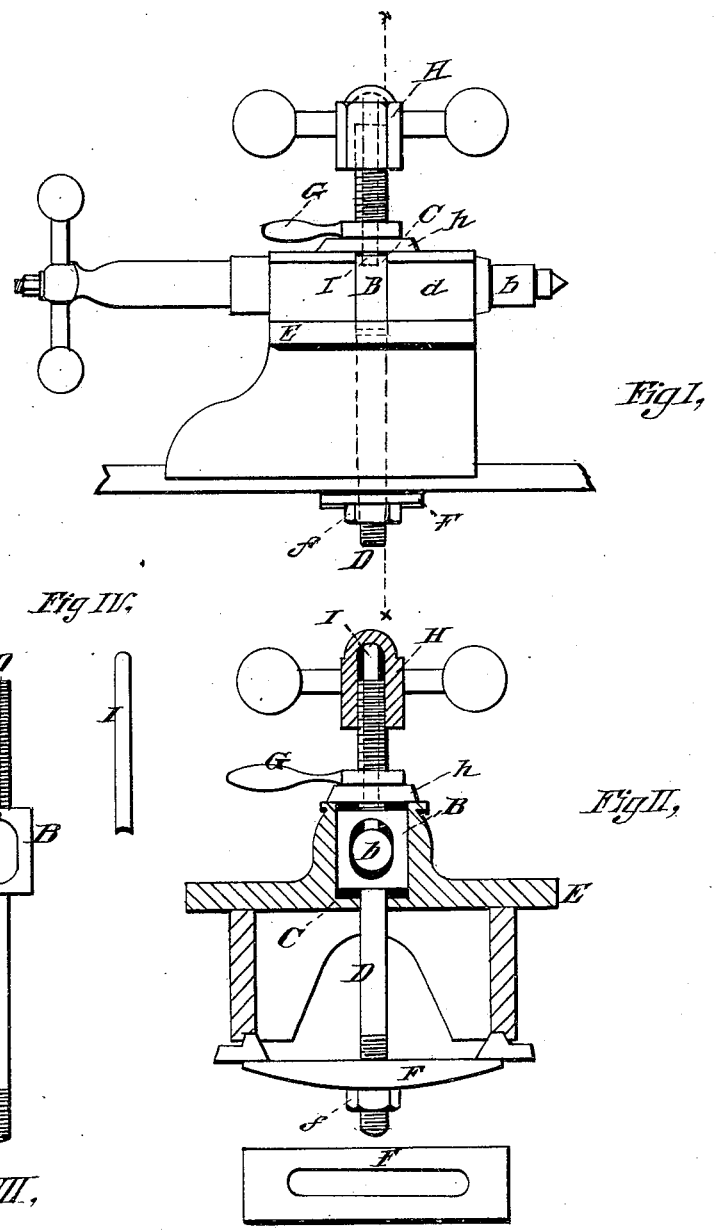
WITNESSES
INVENTOR
Andrew Hyde
by R. F. Hyde
ATTORNEYS

UNITED STATES PATENT OFFICE.

ANDREW HYDE, OF HATFIELD, MASSACHUSETTS.

TAIL-STOCK FOR TURNING-LATHES.

SPECIFICATION forming part of Letters Patent No. 258,582, dated May 30, 1882.

Application filed December 7, 1881. (No model.)

*To all whom it may concern:*

Be it known that I, ANDREW HYDE, a citizen of the United States, residing at Hatfield, in the county of Hampshire and State of Massachusetts, have invented a new and useful Improvement in Lathes, of which the following is a specification.

My invention relates to improvements in the mechanism for adjusting the tail-block upon the lathe and for securing the center-carrying spindle to the tail-block; and it consists in a novel construction and arrangement of the parts forming the clamps for the tail-block and center-spindle, whereby the strength, certainty of action, and convenience of operating these parts are greatly enhanced, as more fully hereinafter described.

In the drawings, Figure I is a side elevation of so much of the tail-block and bed of a lathe as is necessary to illustrate my invention. Fig. II is a vertical section on line $x\ x$ of Fig. I; and Figs. III, IV, and V are detail views.

Prolonged from opposite ends of a key-slide, B, is the bolt D.

Through the sleeve $d$ inclosing the center-spindle $b$, and at the point where the clamp for fixing the spindle is usually placed, is cut a slot, C. The sides of the slot C correspond to those of the key-slide B, so that when the latter is received therein it can have a vertical movement, hereinafter described.

Through the face of the part B is cut an elongated opening, $c$, its shorter diameter exceeding that of the spindle $b$ and its longer permitting a vertical movement in either direction to the slide B without interference with the spindle.

The bolt D extends below the part B to pass through the top plate, E, and through the clamp-plate F, beneath which latter the nut $f$ upon the threaded end of the bolt D comes upon the upward movement of the bolt to clamp the tail-rest to the bed of the lathe. The bolt D, threaded, is prolonged above the part B, through the washer $h$, resting upon the flat upper surface of the sleeve of the tail-block, and bearing thereupon on each side of slot C, and is immediately above the washer provided with a handle-nut, G, which nut, bearing upon the washer, permits by its movement the bolt D to release the clamp F or cause it to be drawn against the bottom of the lathe.

It will be seen that by means of the nut $f$ the relative position of the handle of nut G when the tail-block is fixed to the lathe may be determined, and that also while the clamp-bolt D is arranged to clamp the tail-block from its central portion to the lathe its operating nut-handle is most accessible, and where its relative position forms an indicator.

The bolt D above the part B has a hole bored through its axis from its upper end to communicate with the opening $c$, and the bolt extends sufficiently above the hand-nut G to receive a handle-nut, H, and leave interval between them for their movement upon the bolt without interfering. The nut H has a solid or cupola head.

Through the hollow bolt passes a loose rod, I, having its lower end free to rest upon the spindle $b$, and said end concave to conform to the surface of the spindle, while its upper end projects above the end of the bolt and comes in contact with the inner solid surface of nut H on the bolt D when the nut is run down on the bolt sufficiently far so that when the nut comes onto the rod I the spindle and bolt will be tightly clamped together.

In practice I prefer to face the concave foot of rod I with soft metal, as its wear is immaterial, and no injury can result to the spindle.

The parts of this device being assembled, the adjustment of either the tail-block or spindle is effected easily and quickly, as when the tail-rest is clamped in place and the spindle adjusted the nut to clamp it is run down until its momentum is overcome by the end of the loose rod I, and both adjustments are made with certainty with little care.

Having described my invention, what I claim is—

In a lathe, the combination, with the tail-block and with the spindle $b$, of the clamp-rod D, having the perforated slide B, hollow end, and rod I, washer $h$, or equivalent bearing-surface, handle-nut G, solid top nut, H, and clamp-plate F, arranged to effect the clamping of tail-block and spindle upon a common axis in a vertical line with the axis of the spindle, substantially as shown and described.

ANDREW HYDE.

Witnesses:
SAML. P. BILLINGS,
BRIDGET KELLY.